No. 707,465.  
C. VOGEL.  
EMERGENCY BRAKE.  
(Application filed Mar. 7, 1902.)  
Patented Aug. 19, 1902.

(No Model.)

WITNESSES:

INVENTOR  
Carl Vogel  
BY  
ATTORNEYS

UNITED STATES PATENT OFFICE.

CARL VOGEL, OF NEWBURGH, NEW YORK.

EMERGENCY-BRAKE.

SPECIFICATION forming part of Letters Patent No. 707,465, dated August 19, 1902.

Application filed March 7, 1902. Serial No. 97,085. (No model.)

*To all whom it may concern:*

Be it known that I, CARL VOGEL, a citizen of the United States, and a resident of Newburgh, in the county of Orange and State of New York, have invented a new and Improved Emergency-Brake, of which the following is a full, clear, and exact description.

The purpose of the invention is to provide an emergency-brake or a brake auxiliary to the regular brake adapted for use in connection with cars, locomotives, and like vehicles, which can be instantly brought into service to check the motion of the vehicle whether traveling upon a level surface or up or down grade or hill or over an icy surface by digging in the surface.

Another purpose of the invention is to so construct the brake that it will be simple, durable, and effective and readily applied and so that it will reach its braking position through gravity, and also to provide pneumatic and spring cushions for relieving the shock incident to a sudden and positive check in movement, which cushions are automatically brought into action through the medium of the brake when engaging with the surface over which the car or other vehicle may be traveling.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
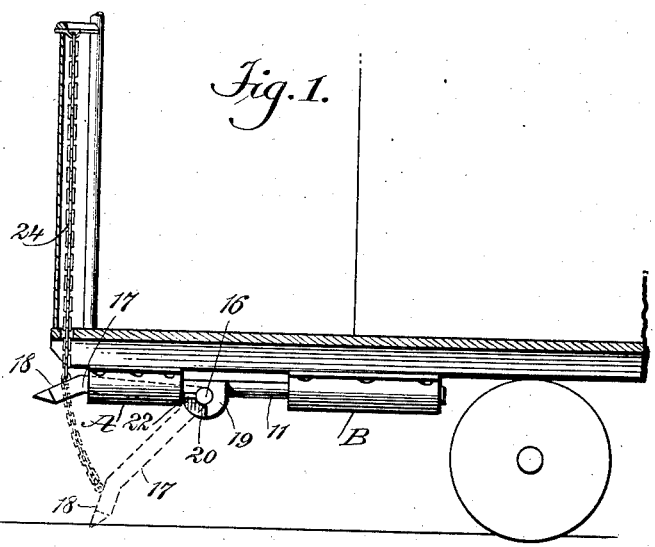
Figure 3:
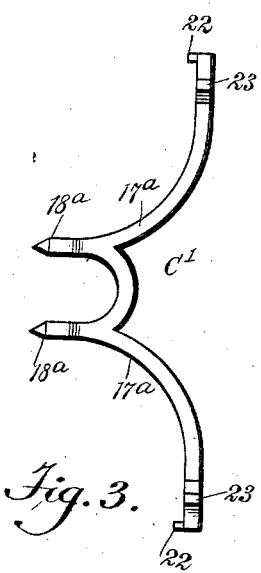
Figure 2:
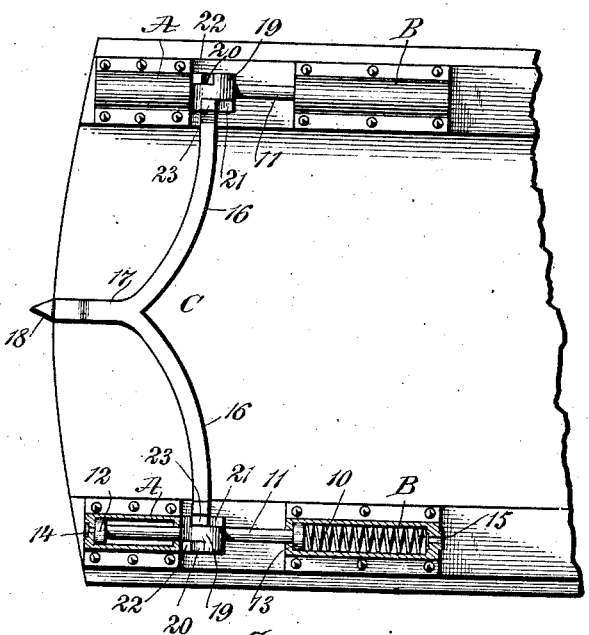

Figure 1 is a vertical section through an end portion of a car having the emergency-brake applied. Fig. 2 is a bottom plan view of that portion of the car shown in Fig. 1 and the improved brake and its connections, a portion of said connections being in section and the brake-bar being of that form adaptable for overhead trolleys; and Fig. 3 is a plan view of a brake-bar adapted for application to cars operated by the underground system.

What may be termed the "frame" of the brake consists of two strong cylinders A and B, secured upon the under surface of the bottom of the car at each side, one back of the other, as is shown in Fig. 2. The cylinders A are air-cylinders and are preferably located near the end of the car, while the rear cylinders B, which are longer than the forward cylinders, are each provided with a strong spring or springs 10. Each two cylinders are connected by a piston-rod 11, carrying heads 12 and 13, one at each end. These piston-rods have end movement in the cylinders, and when a head 12 of a rod 11 is at the outer end of the cylinder A the head 13 of the same rod will be at the inner end of the cylinder B of the same group of cylinders. The cylinders A are provided with air-vents 14 at their outer ends, and the cylinders B have their air-vents 15 at their inner ends, and the springs 10 bear against the inner end surfaces of the cylinders B and against the piston-heads in said cylinders. When the piston-rods are moved inward, their outer heads 12 place the air in the cylinders A under expansion, and the heads 13 place the air in the cylinders B under compression, and the springs 10 under tension. Thus at the inward movement of the piston-rods they meet with the combined resistance of the air and the spring-cushions, and as soon as the piston-rods are released the springs 10 return them to their normal position.

The brake-bar C when it is to be used in connection with an overhead-trolley car or with vehicles having no slots or obstructions centrally between the tracks is constructed as shown in Fig. 2, in which the main or body portions 16 of the bar approach a V shape, and where its members intersect the bar is provided with an outwardly-extending arm 17 in the same horizontal plane with the body members, and at the outer end of the arm 17 a beak 18 is formed, terminating in a point and having the under face of its extremity beveled, and this beak extends lower than the wheels of the car when the brake is applied. The beak 18 is at an obtuse angle to the arm 17, and when the brake is in use it is kept from slipping by means of clutches, to be hereinafter described. The beak is held at an obtuse angle to the horizontal of the car, and the inclination of said beak is downward and outward.

The body members 16 of the brake-bar C are journaled in bearing-boxes 19, secured to or made integral with the piston-rods 11, and said bearing-boxes 19 when the piston-rods 11 are in their normal position are quite close to the inner ends of the cylinders A. Each bearing-block is provided with an inner and outer clutch-face, and such clutch-faces are formed by producing angular recesses 21 and 20 in said side faces of the bearing-boxes extending from the front and rear faces of the boxes to a connection with the openings in which the ends of the body members 16 of the brake-bar turn. Each member 16 of the brake-bar C at its journaled end is provided with two lugs 22 and 23 at right angles to each other, the lugs 22 being at the extremities of the journaled ends of the brake-bar within the recesses 20 of the boxes, and the lugs 23 are so placed as to be within the recesses 21 of the boxes. Normally the brake-bar is held quite close to the bottom of the car, with its body in a horizontal position, as is shown in Fig. 1, through the medium of a chain 24, attached to the arm 17 of the brake-bar and extending up through an opening in the platform of the car to an engagement with a fastening device of such a nature that the chain can be readily cast loose therefrom entirely or in part. As shown, when the brake-bar C is in its upper or horizontal position the lugs 22 in the recesses 20 of the bearing-boxes are horizontal and face the cylinders A, while the opposing lugs 23 in the recesses 21 point downward. Thus in operation if the chain 24 be cast loose the brake-bar C will drop of its own weight and the beak 18 of the brake-bar will strike the ground or the surface over which the car is moving at an obtuse angle and will dig into said surface to bring the car to a standstill and will hold it in such position. As the brake-bar is brought into positive and digging engagement with the surface the brake-bar is turned beneath the car and the lugs 22 bear against the inner walls of the recesses 20, and the lugs 23 will rest upon the upper walls of the recesses 21, and as the body of the car moves forward by reason of its inherent force and the brake-bar remains stationary at an obtuse angle to the horizontal of the car the piston-rods 11 will be forced inward and the piston-heads will expand the air in the cylinders A and will compress the air in the cylinders B and place the springs in the said cylinders B under tension, thus providing cushions to relieve the occupants of the car from undue shock. When the beak of the brake-bar is removed from the ground, the springs in the cylinders B act to return the pistons to their normal positions.

It will be observed that brake-bars may be placed at each end of the cars, so that the cars may be stopped when going downhill, as well as be prevented from slipping back when going uphill.

In Fig. 3 I have illustrated a form of brake-bar C' which is adapted for use on cars operated by the underground trolley system, and in this form of brake-bar two arms 17ª extend from the body member of the bar, and each arm 17ª is provided with a beak 18ª at an obtuse angle to the arm with which it is connected. These arms, with their beaks, are located one at each side of the center of the brake-bar; but the construction at the journaled ends of the brake-bar shown in Fig. 3 is the same as that of the brake-bar shown in Fig. 2.

I desire it to be understood that the brake-bar may be shaped differently than illustrated, as demanded by the construction of the car to which application is to be made, and in order not to interfere with any mechanism at the bottom of the car it is necessary only that when the brake is applied it shall strike the surface over which the car is passing at an obtuse angle to the horizontal of the car and at a point in advance of the line of travel or rearward of the same, according to whether the car is to be stopped in its advance or in its rearward movement. I further desire it to be understood that the construction of the clutch mechanism shown and described may be changed without departing from the spirit of the invention, it being only necessary that the clutches shall act to prevent the beak of the brake from slipping from its operative position—namely, when it digs into the ground. All of the improved brakes upon a train may be operated from the engine or from any special car in the train.

Having thus described my invention, I claim as new and desire to secure by Letters Patent—

1. An emergency-brake for cars and other vehicles, comprising a brake-bar having a body portion consisting of curved members and mounted to turn at its ends, the said body portion being provided with an arm at an angle to the body of the bar and in the same plane with said body, a beak extending downwardly and outwardly from the arm at an obtuse angle to the same, and means for limiting the turning movement of the brake-bar to hold it in operative position, the movement of the vehicle forcing the beak into the surface over which the vehicle is passing, as set forth.

2. In emergency-brakes, cylinders adapted for attachment to a car, pistons for the cylinders, bearings secured to the pistons, a brake-bar having its ends journaled in said bearings and provided with an arm at an angle to the body of the bar and in the same plane therewith, a beak extending at an obtuse angle from the arm in a downward and outward direction, and means for operating the piston-rods in one direction through the rotation of the brake-bar, as described.

3. In emergency-brakes, cylinders arranged in pairs, the cylinders of a pair being one behind the other, which cylinders are adapted for attachment to a car, springs located in the inner cylinders, pistons operating in the cylinders of a pair and against the springs in the inner cylinders, bearing-boxes secured to the pistons at points between the cylinders, said bearing-boxes having angular recesses in their side surfaces, facing in opposite directions and extending from the front and rear faces of the boxes to a connection with the bores thereof, a brake-bar the ends of which are journaled in the bores of the said boxes, the brake-bar being provided with lugs at its journaled ends at right angles to each other, a lug being adapted to operate in each recess of the bearing-boxes, an arm extending at an angle from the brake-bar, which arm is in the same plane with the body of the brake-bar, a beak extending downward and outward from the arm at an obtuse angle thereto, and means for raising the said brake-bar, which brake-bar is adapted to drop through gravity, as and for the purpose specified.

4. The combination with the body of a car, of a gravity emergency-brake, comprising a bar journaled at its ends in bearings carried by a support mounted to slide beneath the car, the said bar being provided with a beak at an obtuse angle to the body of the car and having a downward and outward inclination, means for raising the said brake, the brake being arranged to drop through gravity and the beak being adapted to strike and dig into the surface over which the car is passing, at an obtuse angle to the body of the car, means for limiting the turning movement of the brake-bar in its bearings, to hold the brake in operative position, and a cushion device for the sliding support for the bearings for the brake-bar, as set forth.

5. The combination with the body of a car, of a gravity emergency-brake comprising a bar pivoted at its ends in bearings beneath the car and provided with a beak at an obtuse angle to the body of the car and having a downward and outward inclination, which beak is adapted to strike the surface over which the car is passing, at an obtuse angle to the horizontal of the car, means for limiting the turning movement of the brake-bar in its bearings, and cushions operated by the movement of the brake-bar to check the car, as and for the purpose set forth.

6. In emergency-brakes, the combination with the body of a car or other vehicle, of cylinders secured to the under surface of the body of the vehicle one behind the other, a piston-rod provided with heads operating in the cylinders, a bearing on the piston-rod at a point between the cylinders, and a gravity-brake journaled in the bearing and adapted to engage the surface over which the vehicle is passing, as described.

7. In emergency-brakes, cylinders adapted for attachment to a car or other vehicle, pistons for the said cylinders, bearings secured to the piston-rods, and a brake-bar having its ends journaled in said bearings and provided with a member adapted to engage the surface over which the vehicle may be traveling, and means for operating the piston-rods in one direction from the brake-bar as set forth.

8. An emergency-brake for cars and other vehicles, comprising a brake-bar having a body portion consisting of curved members, the body portion being mounted to turn at its ends and provided at said ends with means for limiting their turning movement, the brake-bar having an outwardly-extending arm at an angle to the body of the bar and in the same plane with said body, and a beak extending downwardly and outwardly from the outer end of said arm at an obtuse angle to the same, for the purpose set forth.

9. The combination with the body of a car or other vehicle, of a gravity emergency-brake journaled beneath the car and provided with a beak adapted to engage the surface over which the car is passing, and a clutch connection between the brake and the bearing in which it is journaled, to limit the turning movement of the brake and hold it in operative position, as set forth.

In testimony whereof I have signed my name to this specification in the presence of two subscribing witnesses.

CARL VOGEL.

Witnesses:
J. FRED. ACKER,
JNO. M. RITTER.